United States Patent [19]

Igarashi et al.

[11] 4,076,412
[45] Feb. 28, 1978

[54] PROCESS FOR PRODUCING MICROFILM COPIES AND APPARATUS THEREFOR

[75] Inventors: Shunkichi Igarashi, Yokohama; Takeshi Okano, Amagasaki; Sho Takahama, Takarazuka; Yoshio Hakamata, Tokyo, all of Japan

[73] Assignee: Fuji Photo Film Co., Ltd., Minami-ashigara, Japan

[21] Appl. No.: 693,671

[22] Filed: Jun. 7, 1976

[30] Foreign Application Priority Data

Jun. 7, 1975 Japan .................. 50-68945
Jun. 20, 1975 Japan .................. 50-76194

[51] Int. Cl.² .......................... G03B 29/00
[52] U.S. Cl. .................................. 355/28
[58] Field of Search ............ 355/39, 77, 27–30, 355/40, 64, 65, 73; 354/211

[56] References Cited

U.S. PATENT DOCUMENTS

| 2,751,814 | 6/1956 | Limberger | 355/28 |
| 2,881,658 | 4/1959 | Bornemann | 355/73 X |
| 3,240,115 | 3/1966 | Robbins et al. | 355/28 |
| 3,259,037 | 7/1966 | Wilkinson | 355/29 |
| 3,289,530 | 12/1966 | Samain | 355/77 X |
| 3,783,763 | 1/1974 | Whitley et al. | 354/211 |

FOREIGN PATENT DOCUMENTS 644,385 10/1950 United Kingdom ............ 355/39

Primary Examiner—Donald Griffin
Attorney, Agent, or Firm—Sughrue, Rothwell, Mion, Zinn and Macpeak

[57] ABSTRACT

Process for producing microfilm copies and apparatus therefor employing silver halide emulsion film which is provided in roll form, wherein subsequent to exposure of the frames of the image-carrier portion the film is advanced a set length without being exposed this unexposed portion constituting the tab portion of the succeeding microfilm unit, and then the exposed image-carrier portion of the film, also preceded by a tab portion, is detached by cutter means from the remainder of the film and processed independently in the same apparatus, and moved to the exterior of the apparatus. An identification code may be written manually on the tab portion of each microfilm unit or may be produced automatically thereon by supplementary film exposure means upon exposure of the first frame of the image-carrier portion of each microfilm unit.

4 Claims, 9 Drawing Figures

PROCESS FOR PRODUCING MICROFILM COPIES AND APPARATUS THEREFOR

BACKGROUND OF THE INVENTION FIELD OF THE INVENTION

The present invention relates to a microfilm system and apparatus. More particularly the invention relates to a microfilm process and apparatus suited to employment in an establishment requiring comparatively small quantity of data to be recorded in microfilm form.

DESCRIPTION OF THE PRIOR ART

Because of the economy of space and other advantages afforded, storage of data in microfilm form has become comparatively common practice in establishments dealing with large quantities of documents. In one type of microfilm system there is provided a continuous roll of 16 mm. or 35 mm. film on which are produced at reduced magnification the images of a succession of documents, and after development and processing, is stored in a convenient location. In another system a so-called microfiche film, which is a special type of film in the form of a sheet on which film frames are disposed in a rectangular array, for example a 5 × 12 array, is employed to obtain microfilm copies of a set of related documents. Both these systems are essentially suited to organizations requiring large amounts of data to be stored in microfilm form. For a comparatively small office or other establishment which occasionally requires to microfilm a small number of documents, for example a dozen, the system employing microfiches is uneconomic, since most of the film on each microfiche is not used. In the system employing roll-film it is possible to avoid the problem of wastage of film, but there is a problem of turn-around time, i.e., since the rate at which microfilm copies of documents is low, microfilming a sufficient number of documents to use an entire roll of film extends over a long period, and there is therefore a long wait until microfilm copies on the initial frames of the film are obtained. There may of course be wastage with the roll-film system also if the purpose of obtaining microfilm copies is to send the copies by post to some other location, in which case it is generally required to develop the film as quickly as possible, even if the roll of film still has unexposed frames.

A further disadvantage of currently marketed conventional microfilm systems is that the systems are generally designed for specific users and generally require comparatively skilled staff for handling the apparatus thereof. From this point of view also, therefore, conventional systems are unsuitable for employment in a small establishment.

A microfilm apparatus suitable for use in a small establishment is that disclosed in Japanese Patent Publication No. 49-91456, in which a roll of electrophotosensitives film is used as the microfilm material, successive frames of this material being electrically charged, exposed, and then developed in the apparatus. However, this apparatus has the disadvantage that to effect the different stages of charging, exposure, and development without affecting adjacent frames, as well as apparatus construction being complex, it is necessary to allow a considerable space between adjacent frames, with the result that the number of microfilm copies obtainable from a roll is limited or frame size must be small. Another disadvantage is that the apparatus is generally not suited to production of microfilm copies of drawings, or similar material, the power of resolution of currently known electrophotosensitive film material being inferior to that of photographic film material including a silver halide emulsion such as employed in other types of microfilm apparatus. Because of these problems, and because of comparatively high initial cost of the disclosed apparatus, it has been found so far that the apparatus is of less practical value than initially anticipated.

It is accordingly a principal object of the invention to provide a microfilm system and apparatus employing film which includes a layer of silver halide emulsion and so gives microfilm copies with good resolution, and permitting production of successive sets of a comparatively small number of microfilm copies of documents each length of film carrying a set of microfilm copies of documents being detachable from and processable independently of the rest of the film, whereby wastage of film is minimum and the microfilm system and apparatus offer particular advantages in employment in small establishments.

It is another object of the invention to provide a process and apparatus permitting production of successive small sets of microfilm copies of documents and also permitting automatic production of identification labels indicative of the contents of successive sets of microfilm copies.

It is a further object of the invention to provide a microfilm system and apparatus providing economy and permitting on-site development of microfilm.

SUMMARY OF THE INVENTION

In accomplishing these and other objects, there is provided according to the present invention a process and apparatus for producing microfilm copies wherein successive portions of film provided in roll form are moved past an exposure station whereat frames of the film may be exposed to light carrying the images at reduced magnification of documents to be copied. The film may be considered to be divided into successive sets of a specific number of frames, for example twelve, each set of frames being preceded by a tab portion which has a length equal to six frames, for example, and which is not employed for carrying images of documents but for recording numerical or other data or symbols identifying the set of documents photographed on the following set of twelve frames. During exposure of image-carrier frames of the film, the film is advanced a distance equal to one frame length each time an external push-button is actuated, whereby successive frames are brought to an exposure station. When twelve complete frames have been exposed, the film roll is automatically moved a distance equal to six frame lengths, which movement brings the last exposed frame to a point slightly beyond a cut-off station, whereat there is provided a cutter unit which is actuated to cut the film subsequent to this six frame length advance thereof, whereby a film unit carrying latent images of photographed documents is separated from the remainder of the roll of film. At this time, between the cutter station and the exposure station there is a length of unexposed film which constitutes the tab portion of the next microfilm unit, and the front end of the microfilm unit which has just been severed from the remainder of the film roll is engaged by a first pair of rolls in a series of advance rolls, which are actuated subsequent to completion of cutter action at the cut-off station. The advance rolls cause the detached microfilm unit to be moved through a processing compartment wherein the exposed film frames are developed and receive other suitable treatment to produce microfilm copies which are ready to use, and the microfilm unit is then moved to the exterior of the apparatus.

The microfilm unit thus obtained is stored in a pocket of a jacket having a plurality of pockets each of which may contain a microfilm unit, and suitably has dimensions such that the unexposed tab portion of a film unit projects therefrom. Identification of the documents recorded by the image-carrier portion of a microfilm unit may be recorded manually on the tab portion. Alternatively, in another embodiment of the invention, there is provided a supplementary optical system via which identification of a set of documents may be automatically recorded on the tab portion simultaneously with exposure of the first frame of the image-carrier portion.

It is not of course essential that the number of frames on the image-carrier portion be twelve, but this number of frames is selected since it is equivalent to the average number of documents expected to be required to be microfilmed at one time in a small establishment.

Thus, according to the invention it is made possible to rapidly obtain microfilm copies of a small number of documents, and there is only a small amount of waste if it is required to microfilm less than the set number of documents at a time. Further, despite this smallscale production, it is possible to use high-quality film and so obtain microfilm copies of good resolution.

A better understanding of the present invention may be had from the following full description of several preferred embodiments thereof when read in reference to the attached drawings, in which like numbers refer to like parts.

DESCRIPTION OF THE PREFERED EMBODIMENT

Figure 1:
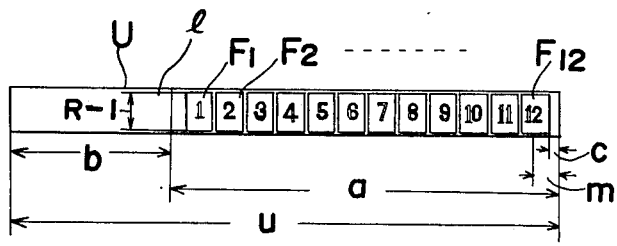
FIG. 1 is a plan view showing one microfilm unit according to the invention.

Referring to FIG. 1, there is shown one microfilm unit $u$ of 16 mm. or 35 mm. film which is employed in the system and apparatus of the invention. Each microfilm unit $u$ comprises a tab portion $b$ constituting the leading end portion of the unit $u$ and having a length equal to six frame lengths, and an image-carrier portion $a$ which includes twelve frames $F_1, F_2 \ldots F_{12}$ which are successively exposed to images of documents. The first frame in the image-carrier portion $a$ is separated from the tab portion $b$, and the last frame is separated from the trailing end of the image carrier portion by a small distance $c$, the distance $m$ in the drawing being equal to the sum of the distance $c$ and one half the distance between centres of a pair of adjacent film frames. Film is initially provided in a continuous roll of film 9 and is cut into successive units $u$, in a manner described below, by cutter means which separate the trailing edge of each unit $u$ from the remainder of the roll of film 9.

Figure 2:
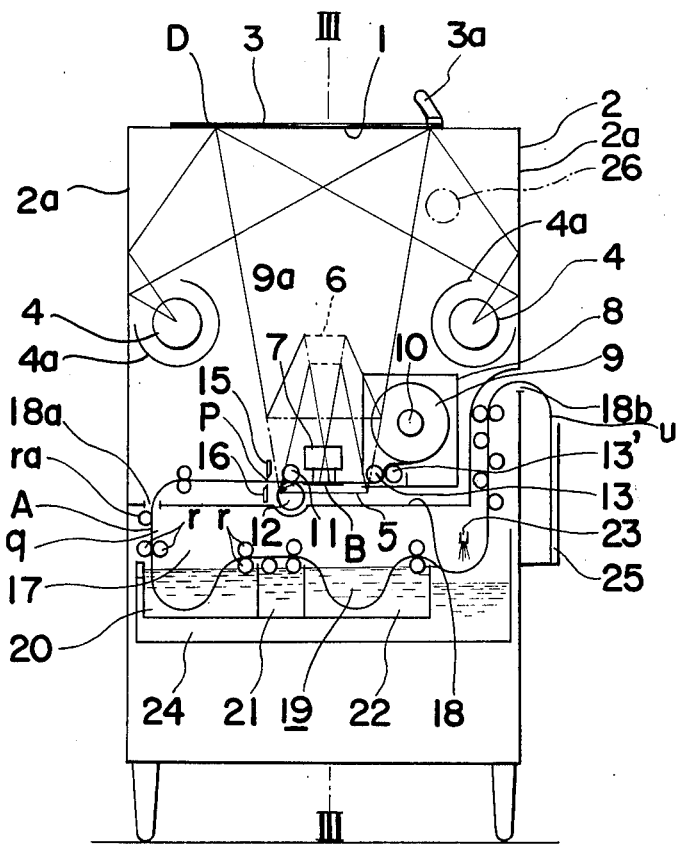
FIG. 2 is a vertical cross-sectional view showing principal elements of a microfilm apparatus according to one embodiment of the invention.
Figure 3:
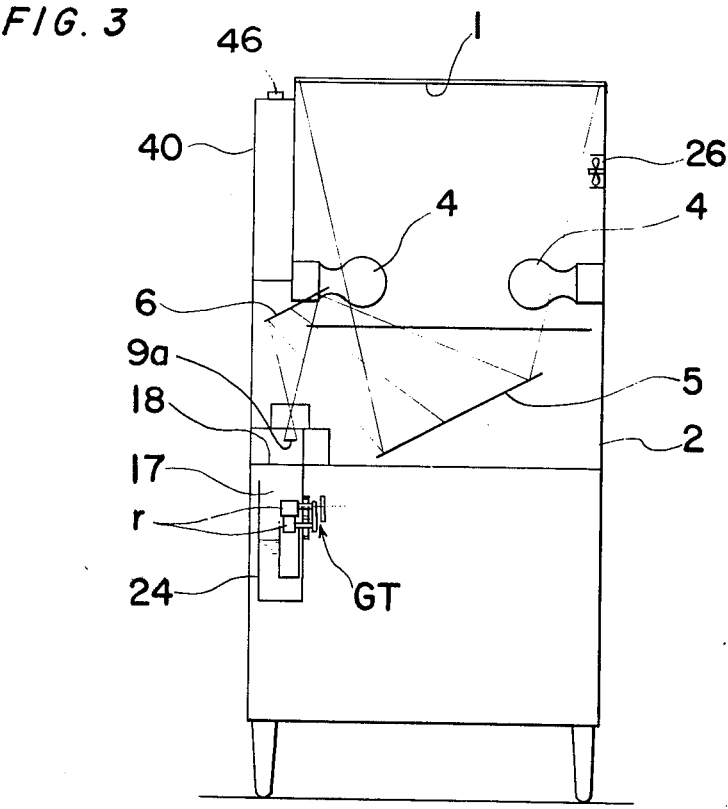
FIG. 3 is a cross-sectional view taken along the line III—III of FIG. 2.

Referring to FIGS. 2 and 3, the roll film 9 is mounted on and unwindable from a reel 10 rotatably supported in a magazine 8 which is provided at a lower, off-centre portion of an exposure compartment defined in the upper portion of a microfilm apparatus by walls of a main housing 2 and a partition 18. The lower portion of the apparatus below the partition 18 constitutes a development and processing compartment 17. Film unwound from the roll 9 is passed between a pair of guide rollers 13 and 13' which are provided in a lower portion of the magazine 8, and passes along a flat guide portion defining an exposure station B, the leading end of the film being engaged by a press roll 11 and a drive roll 12 which is actuable to unwind film from the roll 9. The drive roll 12 and press roll 11 are located on the opposite side of the exposure station B to the guide rolls 13 and 13', whereby good flatness of film at the exposure station B is maintained.

In the top wall of the main housing 2 there is provided a horizontal and transparent document rest 1, on which a document D of which it is required to obtain a microfilm copy is placed. Flatness of a document D placed on the document rest 1 is ensured by a comparatively heavy, opaque cover 3, which may completely cover the document rest 1, is pivotally mounted at one side, and has attached to the opposite side thereof a handle 3a by which the cover 3 may be raised, or lowered to the horizontal position shown in FIG. 2.

At opposite sides of an upper portion of the exposure compartment there are provided light sources 4 with which are associated suitable reflectors 4a and light from which is directed upwards onto mirrors or suitable reflector portions 2a on side walls of the main housing 2, and then onto document D on the document rest 1. Image-wise light is reflected downwards from the document D onto a first mirror 5 which is provided below the level of the light sources 4, is inclined with respect to the document rest 1, and directs the image-wise light onto a second mirror 6 also provided below the light sources 4. The second mirror 6 directs the image-wise light downwards to a focussing and reducing lens system 7 which focuses the image of the document D on the frame 9B of the film 9 which is currently at the exposure station B. Externally mounted on the main housing 2 there is a switch panel 40 provided with switches including a switch 46 which is actuable to actuate the light sources 4 and simultaneously open a normally closed shutter means, not shown, which is provided immediately above the exposure station B, whereby the film frame 9B is exposed to image-wise light from the document D.

Referring mainly to FIG. 2, after passing the exposure station B and the location of the press roll 11 and drive roll 12 the film 9 is brought to a cut-off station P whereat there is provided a movable, upper cutter 15 and a stationary, lower cutter 16 aligned with the upper cutter 15, the cutters 15 and 16 being provided on opposite sides of the film 9. The movable, upper cutter 15 is actuated to cut off successive units $u$, actuation of the cutter 15 being effected in response to angular position of the drive roll 11, as described in greater detail below.

When the trailing end of a microfilm unit u has been brought to the cut-off station P, the leading end portion thereof has been passed through an entry 18a defined in the abovementioned partition 18, moved downwards, and guided by a guide roller ra brought into engagement with a first pair of advance rolls r provided in the development and processing compartment 17 at a location q, which is below and in line with the entry 18a. Needless to say, to ensure requisite forward movement of the microfilm unit 9 into engagement with the first pair of advance rolls r, there may be provided between the cut-off station P and the location q forwarding roll means rf, which are suitably actuated simultaneously with the drive roll 12.

Figure 5:
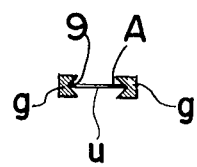
FIG. 5 is a schematic cross-sectional view of processing compartment guide means provided in the apparatus of FIG. 2.

A plurality of other advance rolls r and guide rolls ra are provided in the development and processing chamber 17 along a film advance path A which is defined between a pair of V-shaped guide elements g such as shown in cross-section in FIG. 5, the distance between the notch portions of the guides g being generally equal to the width of a microfilm unit u. All the advance rolls r are actuated simultaneously by drive means not shown, acting through independent gear train means GT such as shown in FIG. 3, upon termination of action of the cutters 15 and 16. Allowing for curvature of the microfilm unit u, the distance between the location q of the first pair of advance rolls r and the cut-off station P, and between any two adjacent pairs of rolls r is slightly less than the total length of a microfilm unit u, both ends of which are therefore always engaged by roll means.

In FIG. 2, when the advance rolls r are actuated, the detached microfilm unit u is moved thereby successively a bath 20 containing developer solution, a rinsing bath 21, and a bath 22 containing a fixing solution, the baths 20, 21 and 22 together constituting a bath processing unit 19. The entire processing unit 19 is contained in a bath 24 containing water which is held at a steady temperature by heater and thermostat control means not shown, whereby the temperature in the baths 20, 21, and 22 is maintained at a requisite value. After leaving the processing unit 19 the microfilm unit is subjected to a spray of water directed thereonto by a spray unit 23 for removal of adhering fixing solution, is moved upwards through a passage defined between an upwardly extending portion of the partition 18 and a wall of the main housing 2, and finally is moved through an exit 18b and into a receiver 25 which is provided on the exterior of the main housing 2 and from which the processed microfilm unit u may be subsequently removed by the user.

In FIGS. 2 and 3, in an upper portion of the exposure compartment there is provided a blower 26 which acts to blow air from the exterior of the apparatus through the exposure compartment, through the entry 18a, through the development and processing compartment 17, and through the exit 18b to the exterior of the apparatus. This air flow caused by the blower 26 acts to prevent vapors produced above the developing solution bath 20 from entering the exposure compartment and so prevents corrosion in the exposure compartment, and also helps to dry microfilm units u subsequent to washing by the spray unit 23 and acts to seal the development and processing compartment 17 from infiltration of air of variable temperature which could otherwise enter via the exit 18b and have a direct effect on the drying zone on the portion of the microfilm unit path A subsequent to the spray unit 23.

Figure 4:
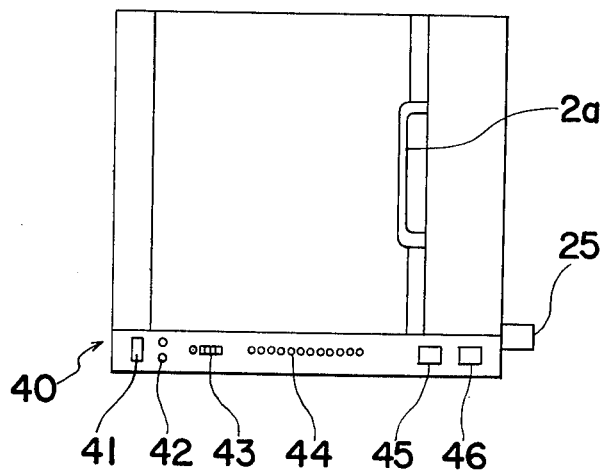
FIG. 4 is a plan view of the apparatus of FIG. 2 showing layout of a control panel.

In FIG. 4, the control panel 40 has provided on an upper portion thereof, which is easily accessible to the user, a main power connection switch 41, a lamp 42 which lights if the temperature of processing solution in the bath 20 is not in a requisite range, in order to warn the user to temporarily halt exposure of subsequent microfilm units u, a counter 43 which indicates the number of microfilm units u remaining in the roll of film 9, an indicator 44 which indicates serial numbers of exposed frames of the microfilm unit u currently being processed, a processing command switch 45, which, when a control mode switch 45a switchable to cause automatic control or manual control is set to a manual control position, is actuable to cause actuation of the advance rolls r, actuation of the rolls r being effected automatically upon cut-off of a microfilm u, as described above, if the control mode switch 45a is set to the automatic control position, and the abovementioned exposure switch 46 for effecting exposure of a film frame at the exposure station B.

Figure 6:
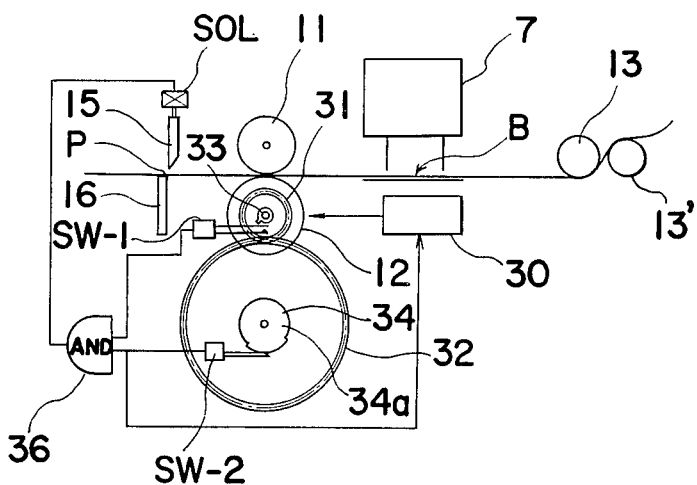
FIG. 6 is a schematic drawing showing a microfilm feed and cutter control circuit.

Reference is now had to FIG. 6 which shows a control circuit including an intermittent drive means, which normally acts to cause the microfilm drive roll 12 to rotate 1/6 of a revolution each time an actuation switch on the control panel 40 is pressed. Each time the drive roll 12 is rotated this amount, the microfilm 9 is advanced a distance equal to one frame length, whereby successive frames thereof are brought to the exposure station B. In other words, the drive roll 12 must be rotated two complete revolutions in order to bring all twelve frames of a microfilm unit u to the exposure station B. Exposure of successive frames is effected by actuation of switch means 46 to actuate the light sources 4 and open the shutter means provided below the document rest 1, as noted above.

In fixed, coaxial connection with the drive roll 12 there is a small diameter gear 31 which engages and drives a freely rotatable, large diameter gear 32, the ratio of the diameter of gear 32 to that of gear 31 being 3 : 1. The small diameter gear 31 carries a cam element 33 having a single, small projection which once every revolution of the gear 31 closes a normally open switch SW-1, thereby providing input to one input terminal of a two-input AND gate 36. The AND gate 36 may supply actuation input to a solenoid and plunger assembly SOL causes the abovementioned upper cutter 15 to move downwards into sliding contact with the lower cutter 16 and so cut film 9. The large diameter gear 32 carries a cam 34 having a projecting portion 34a which defines a 120° segment of a circle centered on the rotatory axis of the gear 32 and which during one-third of each revolution of the gear 32 closes a normally open switch SW-2. When closed, the switch SW-2 supplies input to the other input terminal of the AND gate 36, and also supplies control input to the intermittent drive means 30, which causes the drive means 30 to advance the film 9 a distance equal to six frame lengths. The cams 31 and 34 are so mounted that closure of switch SW-2 by cam projection 34a commences immediately after cam 33 rotating with the drive roll 12 moves out of engagement with switch SW-1 and also after the last frame on the image-carrier portion of a microfilm unit u has been moved past the exposure station B.

With this circuit therefore, presuming it is wished to obtain microfilm copies of twelve documents, subsequent to the first frame of a microfilm unit u being brought to the exposure station B, the light source and shutter actuation switch 46 and film advance switch 45 are each actuated twelve times. For occasions on which it is required to obtain microfilm copies of less than twelve documents, for example ten documents, after a latent image of the last document to be microfilmed has been formed on the film 9 the film advance switch 45 is actuated two times without the light source and shutter actuation switch being actuated, or there may be provided a supplementary film advance switch which causes the film 9 to be moved two or more frame lengths at a time. In all cases, after latent images of documents required to be microfilmed have been formed on the film 9, the cam projection 34a closes the switch SW-2, whereby six frames of the film 9 are moved, unexposed, past the exposure station B, the last frame of the image-carrier portion a of the microfilm unit u is moved to a short distance past the cut-off station P, and, while switch SW-2 is still closed, switch SW-1 is closed by cam 31, whereby the cutter 15 is actuated to detach the microfilm unit u carrying latent images of the last set of documents. At this time, the six frames which have been moved unexposed past the exposure station B, being to the right of the cut-off station P as seen in FIG. 2 and therefore still attached to the remainder of the roll of film 9, constitute the tab portion b' of the next microfilm unit u', and the first frame of this next microfilm unit u' is at the exposure station B ready to be exposed.

The tab portion b of the preceding microfilm unit u is engaged by the first pair of advance rolls r, which, together with the other pairs of advance rolls r, are now actuated automatically, or by actuation of the processing command switch 45, and move the microfilm unit u through the above-described development and processing stages and then into the receiver 25.

Figure 7:
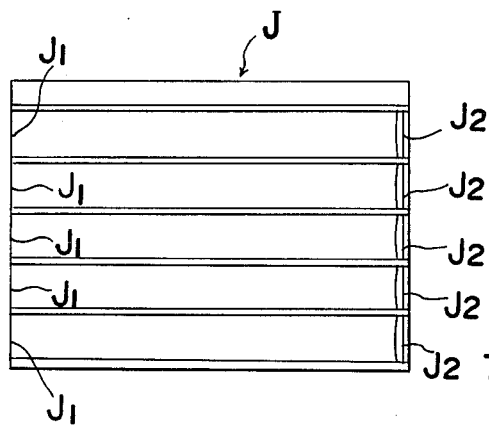
FIG. 7 is a plane view of a jacket for storage of a plurality of processed microfilm units.

The tab portion b of the processed microfilm unit u is marked with a code, for example R-1 as shown in FIG. 1, to identify the microfilmed documents, and the microfilm unit is then stored in the pocket of a jacket J, which as shown in FIG. 7 has a plurality of pockets for containing microfilm units with an inlet $J_1$ and an outlet $J_2$ at the both sides, the tab portion of each microfilm unit extending from a pocket and so permitting rapid retrieval of required sets of documents.

Thus, a completed set of microfilm copies of a small number of documents may be obtained in a very short time, but the remainder of the roll of film 9 may be left in the microfilm apparatus ready for subsequent use, whereby problems of wastage are avoided.

Figure 8:
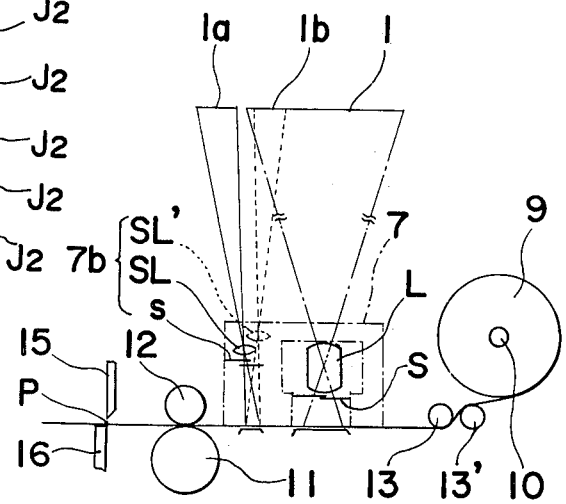
FIG. 8 is a side view of a microfilm exposure system according to another embodiment of the invention.

According to another embodiment of the invention shown in FIG. 8, a code identifying a set of microfilmed documents is recorded automatically on the tab portion b of each microfilm unit u. In this embodiment of the invention in addition to the focussing and reduction lens system 7 there is provided a first supplementary lens system SL which, in terms of advance of film 9, is forward of the lens system 7, which causes less reduction of an image than the lens system 7, and with which there is associated a shutter s. Directly above the first supplementary lens system SL there is a document rest extension 1a, which also may be illuminated by the light sources 4, and on which may be placed a card or similar element marked with an identification code. The shutter s associated with the first supplementary lens system SL is opened only upon exposure of the first frame of a microfilm unit u, at which time the image of the card supported on the document rest extension 1a is focussed by the first supplementary lens system SL onto the tab portion b of the microfilm unit u. After this the shutter s remains closed until the first frame of the next microfilm unit u' is exposed. Upon passage of the microfilm unit u through the development and processing compartment 17, the image on the tab portion b is developed in the same manner as other image-carrying portions of the microfilm unit u.

If it is preferred to identify a set of documents by a code written actually on the first document of the set, rather than by a separate card, there may be provided a second supplementary lens system SL' which directs light from a forward portion 1b of the document rest 1 to the first supplementary system SL. In this case, the top, for example, of the first document is marked with the identification code, and this portion of the document is placed on the forward portion 1b of the document rest 1. As before, the shutter s opened only when the first frame of a microfilm is exposed, whereupon the image of the identification code is directed onto the tab portion b of the microfilm unit u by the supplementary lens systems SL and SL'.

Needless to say, provision of the second supplementary lens system SL' is most suitable for establishments employing documents which have a generally standard format and each have a top blank portion. Also, of course, the first supplementary lens system SL and second supplementary lens system SL' need not be both provided in one and the same microfilm apparatus, but may be provided independently in different apparatus.

Figure 9:
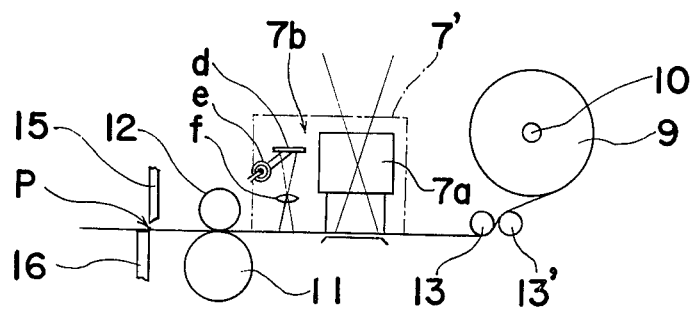
FIG. 9 is a microfilm exposure system according to another embodiment of the invention.

In another embodiment of the invention shown in FIG. 9 there is provided a focussing and reducing lens system 7a which is the same as the focussing and reducing lens system described in reference to the first embodiment of the invention, and also a supplementary exposure system 7b which includes a light source e, focussing lens f and data board d. The data board d is situated directly above the tab portion b of a microfilm unit u, when the first frame of the image-carrier portion a of the microfilm unit u is at the exposure station B, and carries a plurality of numbers or letters, etc., which may be moved to different combinations by means of an externally actuable dial means not shown. The focussing lens f is positioned below the data board d and may direct the image thereof onto the tab portion b of a microfilm unit u upon illumination thereof by the light source e. Light emitted by the light source e is allowed to illuminate only the data board d, and the light source e is actuated only upon exposure of the first frame of a microfilm unit u, thus automatically producing an identification code on the tab portion b of the microfilm unit u. The embodiment of FIG. 9 has the advantage of simpler construction, since the focussing lens f may be of a comparatively simple type and because additional shutter means and shutter actuation means are not required.

What is claimed is:

1. In a microfilm apparatus for a microfilm system which employs silver halide photographic film material in roll form, and forming subsequent to exposure and development a plurality of microfilm multi-frame units each comprising an image-carrier portion of multiple frames of set number exposed for production at reduced magnification microfilm copies of documents at respective frames, and a tab portion of a multi-frame set length for carrying an identification code indicative of the content of a set of documents, said microfilm apparatus comprising:

an exposure station and a development and processing station;

drive roll means positioned near said exposure station and operable to feed film material in roll form to said exposure station to permit individual frames of said film material to be exposed to image-wise light reflected from individual documents to be microfilmed, means for actuating said drive roll means to unwind said roll of film material and move successive frames of said film material to and past said exposure station;

control means for causing said drive roll means to intermittently move said film material a distance equal to one frame length to permit a set number of film material frames to be successively brought to said exposure station, and for continuously moving said film material a plural number of frames over a set distance subsequent to bringing said set number of frames individually and sequentially to said exposure station;

cutter means, and means for actuating said cutter means by said control means for cutting said film material to detach successive microfilm multi-frame units from the remainder of said film material prior to development and processing; and independently actuable advance roll means for advancing successive microfilm units including said tab portion and said multi-frame document exposed portions through said development and processing stations.

2. A microfilm apparatus as claimed in claim 1, which includes a main film exposure means including a focussing and reducing lens system for directing image-wise light reflected from documents to be microfilmed to said exposure station, and a supplementary exposure means which functions only upon exposure of the first frame of said image-carrier portion of successive microfilm units for directing an identification code image onto said tab portion of each said microfilm unit.

3. A microfilm apparatus as recited in claim 2, wherein said supplementary exposure system includes a supplementary lens system and associated supplementary shutter means, said supplementary lens system including means for directing the image of an identification code carried by a document to be microfilmed or by an element positioned adjacent to said document onto said film, and means for preventing said supplementary shutter means from being opened until exposure of the first frame of said image-carrier portion of each said microfilm unit.

4. A microfilm apparatus as claimed in claim 2, wherein said supplementary exposure system includes a data board means carrying a plurality of identification code elements, externally actuable means for setting said board to different combinations, a focussing lens for focussing the content of said data board means onto said tab portion of each said microfilm unit, and a light source, and means for controlling energization of said light source such that said light source is actuated only upon exposure of said first frame of said image-carrier portion of each film unit to illuminate said data board means.

* * * * *